(12) United States Patent
Horie et al.

(10) Patent No.: US 11,327,793 B2
(45) Date of Patent: May 10, 2022

(54) GARBAGE COLLECTION WORK STEALING MECHANISM

(71) Applicant: INTERNATIONAL BUSINESS MACHINES CORPORATION, Armonk, NY (US)

(72) Inventors: Michihiro Horie, Saitama (JP); Kazunori Ogata, Saitama (JP); Mikio Takeuchi, Kanagawa (JP); Hiroshi Horii, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 16/793,722

(22) Filed: Feb. 18, 2020

(65) Prior Publication Data
US 2021/0255894 A1    Aug. 19, 2021

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
CPC ...................................................... G06F 9/4881
USPC ......................................................... 718/102
See application file for complete search history.

(56) References Cited

U.S. PATENT DOCUMENTS

| | | | | |
|---|---|---|---|---|
| 6,823,351 B1* | 11/2004 | Flood | ................. | G06F 12/0276 |
| 7,472,231 B1* | 12/2008 | Cihla | ................. | G06F 12/0804 |
| | | | | 711/144 |
| 7,584,472 B1* | 9/2009 | McCormick | ............ | H04L 47/10 |
| | | | | 710/56 |
| 7,779,222 B1* | 8/2010 | Lev | ........................ | G06F 12/023 |
| | | | | 711/170 |
| 9,317,339 B2* | 4/2016 | Lev | ........................ | G06F 9/5083 |
| 9,348,658 B1* | 5/2016 | Robison | .................. | G06F 9/522 |
| 10,846,217 B1* | 11/2020 | Horie | ..................... | G06F 9/5022 |
| 2003/0005025 A1* | 1/2003 | Shavit | ................... | G06F 9/4843 |
| | | | | 718/102 |
| 2005/0132374 A1* | 6/2005 | Flood | .................. | G06F 12/0276 |
| | | | | 718/100 |
| 2007/0143326 A1* | 6/2007 | Chase | ..................... | G06F 7/785 |

(Continued)

FOREIGN PATENT DOCUMENTS

JP        H11242658 A        2/1998

OTHER PUBLICATIONS

Arora et al., "Thread Scheduling for Multiprogrammed Multiprocessors", Proceedings of the Tenth Annual ACM Symposium on Parallel Algorithms and Architectures (SPAA), Jun. 1998, pp. 1-11.

(Continued)

*Primary Examiner* — Mehran Kamran
(74) *Attorney, Agent, or Firm* — Tutunjian & Bitetto, P.C.; Randall Bluestone

(57) ABSTRACT

Systems and methods for processing hierarchical tasks in a garbage collection mechanism are provided. The method includes determining chunks in a task queue. Each chunk is a group of child tasks created after processing one task. The method includes popping, by an owner thread, tasks from a top side of the task queue pointed at by a chunk in a first in first out (FIFO) pop. The method also includes stealing, by a thief thread, tasks from a chunk in an opposite side of the task queue.

16 Claims, 12 Drawing Sheets

(56) References Cited

U.S. PATENT DOCUMENTS

| | | | | |
|---|---|---|---|---|
| 2008/0112423 | A1* | 5/2008 | Christenson | H04L 49/90 370/412 |
| 2008/0250089 | A1* | 10/2008 | Siegwart | G06F 12/0253 |
| 2009/0241115 | A1* | 9/2009 | Raffo | G06Q 30/02 718/100 |
| 2009/0320027 | A1* | 12/2009 | Ringseth | G06F 9/522 718/102 |
| 2010/0211753 | A1* | 8/2010 | Ylonen | G06F 12/0253 711/165 |
| 2011/0072241 | A1* | 3/2011 | Chen | G06F 9/546 712/202 |
| 2011/0122892 | A1* | 5/2011 | Lipschutz | H04L 49/103 370/474 |
| 2011/0302584 | A1* | 12/2011 | Pingali | G06F 30/23 718/102 |
| 2012/0102501 | A1* | 4/2012 | Waddington | G06F 9/5061 718/105 |
| 2014/0108759 | A1* | 4/2014 | Iwamitsu | G06F 3/0604 711/165 |
| 2014/0282595 | A1* | 9/2014 | Lev | G06F 9/5083 718/105 |
| 2016/0154677 | A1* | 6/2016 | Barik | G06F 9/5083 718/105 |
| 2016/0171147 | A1* | 6/2016 | Chen | G06F 30/39 716/134 |
| 2016/0232035 | A1* | 8/2016 | Lev | G06F 9/5083 |
| 2017/0083904 | A1* | 3/2017 | Vadera | G06K 7/084 |
| 2018/0314631 | A1* | 11/2018 | Horie | G06F 9/4843 |
| 2018/0314633 | A1* | 11/2018 | Horie | G06F 9/4843 |
| 2019/0294469 | A1* | 9/2019 | Voss | G06F 9/4881 |
| 2020/0050484 | A1* | 2/2020 | Horie | G06F 12/0284 |
| 2020/0225883 | A1* | 7/2020 | Bhimani | G06K 9/6218 |
| 2020/0356473 | A1* | 11/2020 | Horie | G06F 9/4881 |
| 2020/0387322 | A1* | 12/2020 | Horie | G06F 3/064 |

OTHER PUBLICATIONS

Mell et al. "The NIST Definition of Cloud Computing", NIST Special Publication 800-145, 2011, 7 pages.

Raghunathan et al., "Hierarchical Memory Management for Parallel Programs", ICFP 2016: Proceedings of the 21st ACM SIGPLAN International Conference on Functional Programming, Sep. 2016, 15 pages.

* cited by examiner

```
// Drains all the tasks in the queue q
while (!q->empty()) {
    q->LIFO_pop(t);
    // Processes a task and pushes the
    // child tasks in a new chunk.
    int numChildren = q->process_task(t);

// Take tasks in the FIFO order.
    while (--numChildren) {
        q->FIFO_pop(t);
        // Processes a task and pushes the
        // child tasks in the current chunk.
        q->process_task(t);
    }
}
```

FIG. 3

GARBAGE COLLECTION WORK STEALING MECHANISM

BACKGROUND

The present invention generally relates to computer processing, and more particularly to processing of tasks in a queue.

To increase memory locality, systems are known to implement ordering of object allocation. This can be implemented using garbage collection (GC), which is a form of automatic memory management in computer science. The garbage collector attempts to reclaim garbage, or memory occupied by objects that are no longer in use by the program. When a GC occurs, computer management devices can change the ordering of allocated objects.

SUMMARY

In accordance with an embodiment of the present invention, a method for processing hierarchical tasks in a garbage collection mechanism are provided. The method includes determining chunks in a task queue. Each chunk is a group of child tasks created after processing one task. The method includes popping, by an owner thread, tasks from a top side of the task queue pointed by a chunk in a first in first out (FIFO) pop. The method also includes stealing, by a thief thread, tasks from a chunk in an opposite side of the task queue.

In accordance with an embodiment of the present invention, a system for processing hierarchical tasks in a garbage collection mechanism includes a memory device for storing program code, and a processor device operatively coupled to the memory device and configured to execute program code stored on the memory device. The processor device determines chunks in a task queue. Each chunk is a group of child tasks created after processing one task. The processor device also pops, by an owner thread, tasks from a top side of the task queue pointed by a chunk in a first in first out (FIFO) pop. The processor device steals, by a thief thread, tasks from a chunk in an opposite side of the task queue.

BRIEF DESCRIPTION OF THE DRAWINGS

The following description will provide details of preferred embodiments with reference to the following figures wherein:

FIG. 3 is a block diagram showing an example process of creating a chunk for child tasks, in accordance with an embodiment of the present invention;

DETAILED DESCRIPTION

Embodiments of the present invention are directed to processing hierarchical tasks in a garbage collection (GC) mechanism. The example embodiments generate a group of tasks (chunk) in a queue. The chunk is a group of child tasks created after processing one task. The systems and methods implement popping the task from the top-side of a chunk in the first in first out (FIFO) pop by an owner thread, and stealing tasks from a chunk in the opposite side (bottom) of the queue by a thief thread. The example embodiments allow work-stealing that enables both FIFO and last in first out (LIFO) ordering of objects. The example embodiments implement work-stealing that maintains load balancing. The example embodiments reduce the response time of applications by reducing the pause time of GC.

In example embodiments, the systems implement switching from the FIFO pops to last in first out (LIFO) pops after an owner thread processes a predefined number of child tasks.

Figure 1:
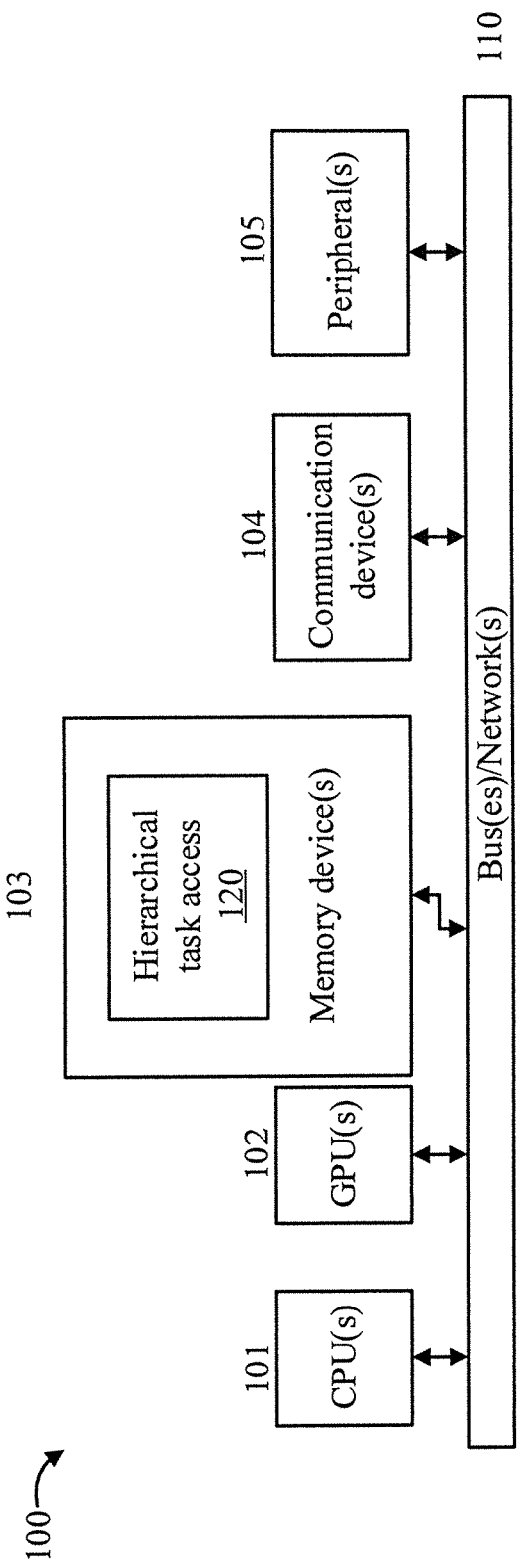
FIG. 1 is a block diagram showing an exemplary processing system 100, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

As shown in FIG. 1, memory device 103 includes instructions for implementing hierarchical task access 120 as described with respect to FIGS. 2 to 10 herein below. The hierarchical task access 120 can include instructions for implementing hierarchical task access on a LIFO concurrent deque. A deque represents a queue which is thread safe to put elements into, and take elements out of from. In other words, multiple threads can be inserting and taking elements concurrently the deque without any concurrency issues arising. The hierarchical task access 120 can include making a group of tasks (chunk) in a queue. The chunk is a group of child tasks created after processing one task. In example embodiments, in a FIFO pop, tasks can be popped from the top-side of a chunk by an owner thread. A push operation stores a task on a stack and a pop operation retrieves a task from the stack. The hierarchical task access 120 can include switching from the FIFO pops to LIFO pops after the owner thread processes a predefined number of child tasks. For example, the number of child tasks can be predefined as 8. The hierarchical task access 120 can also include stealing tasks from a chunk in the opposite side (bottom) of the queue by a thief thread.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
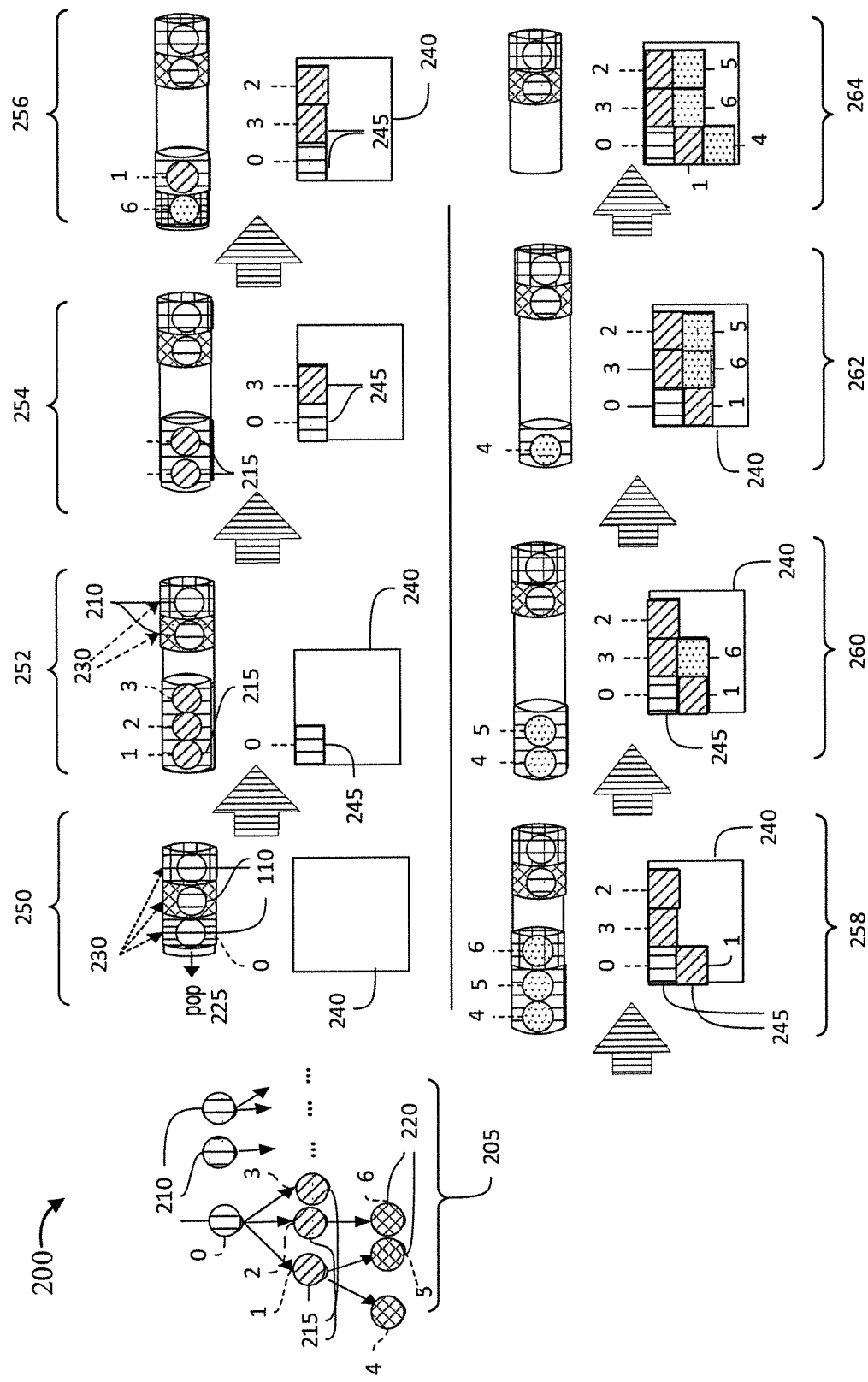
FIG. 2 is a block diagram showing an object tree and a process to pop child tasks in a first in first out (FIFO) system, in accordance with an embodiment of the present invention.

FIG. 2 is a block diagram 200 showing an object tree and a process to pop child tasks in a first in first out (FIFO) system, in accordance with an embodiment of the present invention.

As shown in FIG. 2, tasks can be processed from an object tree 205 that includes tasks (shown as 1, 2, 3, 4, 5 and 6 in object tree 205 and indicated by broken lead lines) at different levels 210, 215 and 220 of the object tree 205. Tasks can be reversely iterated. The example embodiments can implement processes to pop tasks in either LIFO or FIFO manner at runtime in GC work-stealing mechanism for the purpose of increasing the memory locality for application threads that access objects in the breadth or hierarchical order.

In implementing garbage collection (GC), the systems described herein process objects in a depth-first order on the basis of a work-stealing mechanism. The manner in which allocated objects are accessed by the application threads is dependent on the particular application. Locality of memory access becomes lower when an application often accesses objects in the breadth-first order. Breadth-first search (BFS) is a process for traversing or searching tree or graph data structures. BFS starts at an arbitrary node of the graph or the tree root, and explores all of the neighbor nodes at the present depth prior to moving on to the nodes at the next depth level.

The example embodiments allow configuration of a system for wider applicability on various memory locality. The example embodiments systems provide first-in first-out (FIFO) order and a combination of LIFO and FIFO orders. The example embodiments allow accessing tasks in a non-FIFO order on work-stealing queue thereby avoiding the expense associated with FIFO order of the owner thread requiring additional CAS operation to pop a task from the end of the queue from which thief threads try to steal. The example embodiments implement work-stealing that enables both FIFO and LIFO ordering of object. The example embodiments implement work-stealing that maintains load balancing. A load is balanced when all the threads process similar amount of works for each. When the load is balanced, the system shortens the total elapsed time to finish all the works.

According to an example embodiment, there are two worker threads (for example, threads A and B), which have their own works. In an example scenario, worker thread A quickly finishes its own work and worker B still has remained works (due to some reasons such as initial amount of work for A is small, or work for A happens to be light-weight, etc.). When A becomes idle and B is still working, the load is imbalanced. If worker thread A gets some of the remaining work from worker thread B, it means the load can be balanced. Work-stealing enables the worker threads to get work from other threads.

FIG. 2, particularly stages 250 to 264, denoted by brackets, also illustrates a process to pop tasks in a FIFO manner (by way of illustration, LIFO pop can also be implemented in a similar manner as described with respect to FIFO pop and FIG. 2) at runtime in GC work-stealing mechanism for the purpose of increasing the memory locality for application threads that access objects in the breadth or hierarchical order. An owner thread makes groups of tasks, which are called as chunks 230. Child tasks created after processing one task is a chunk. The processes for constructing a chunk 230 can be customized. For example, an owner thread can create a chunk 230 by grouping a constant number of child tasks.

An owner thread pops 225 a task from the top-side of a chunk in the FIFO pop. When the owner thread pops 225 all the tasks in a chunk 230, it then pops a task from the next chunk 230. The tasks are added to heap memory 240. In heap allocation, heap memory is allocated during execution of instructions (for example, written by programmers). The heap memory 240 is a pile of memory space available to programs to be allocated and de-allocated. At stages 252, 254 and 256, tasks 3, 2, and 1 are added to heap memory 240. Tasks 4 and 5, the child tasks for task 1, and task 6, the child task for task 2, are popped in a FIFO manner.

A thief thread can try to steal tasks from a chunk 230 in the opposite side of the queue. In the example embodiments there are no conflicts between the owner and thief threads, because the owner and thief threads implement tracking and updating of the marker pointers that indicate which chunk they are processing.

According to an additional embodiment, which can be implemented as an extension, hierarchical order can be also enabled by combining LIFO and FIFO pops. LIFO pop enables depth-first order, while FIFO pop enables breadth-first order. Hierarchical order can be realized by using both depth-first and breadth-first orders. Hierarchical memory is a hardware optimization that takes the benefits of spatial and temporal locality and can be used on several levels of the memory hierarchy. The order of switching LIFO and FIFO pops is predefined as the owner thread's behavior, and the process of defining the order can be customized. For example, according to an example implementation, when an owner thread processes a task in the LIFO manner, a constant number of child tasks are processed in the FIFO manner.

FIG. 3 is a block diagram showing a process 300 for an owner thread creating a chunk for child tasks, in accordance with an embodiment of the present invention.

An owner thread creates a chunk 230 before pushing a new task. The push operation can be implemented to add an element to the collection. By executing the processes shown in FIG. 3, for example, the owner thread creates a task by grouping a constant number of tasks. A constant number of tasks can be defined manually by users. Alternatively, the constant number can be tuned automatically by the system. The owner thread can thereby pop a task in the LIFO manner. The owner thread can also pop its child tasks in the FIFO manner. The owner thread can implement this process using instructions such as:

```
Drains all the tasks in the queue q while (!q->empty( )) {
    q->LIFO_pop(t);
    // Processes a task and pushes the child tasks in a new chunk.
    int numChildren = q->process_task(t);
    // Take tasks in the FIFO order.
    while (--numChildren) {
        q->FIFO_pop(t);
        // Processes a task and pushes the
        // child tasks in the current chunk.
        q->process_task(t);
    }}.
```

Figure 4:
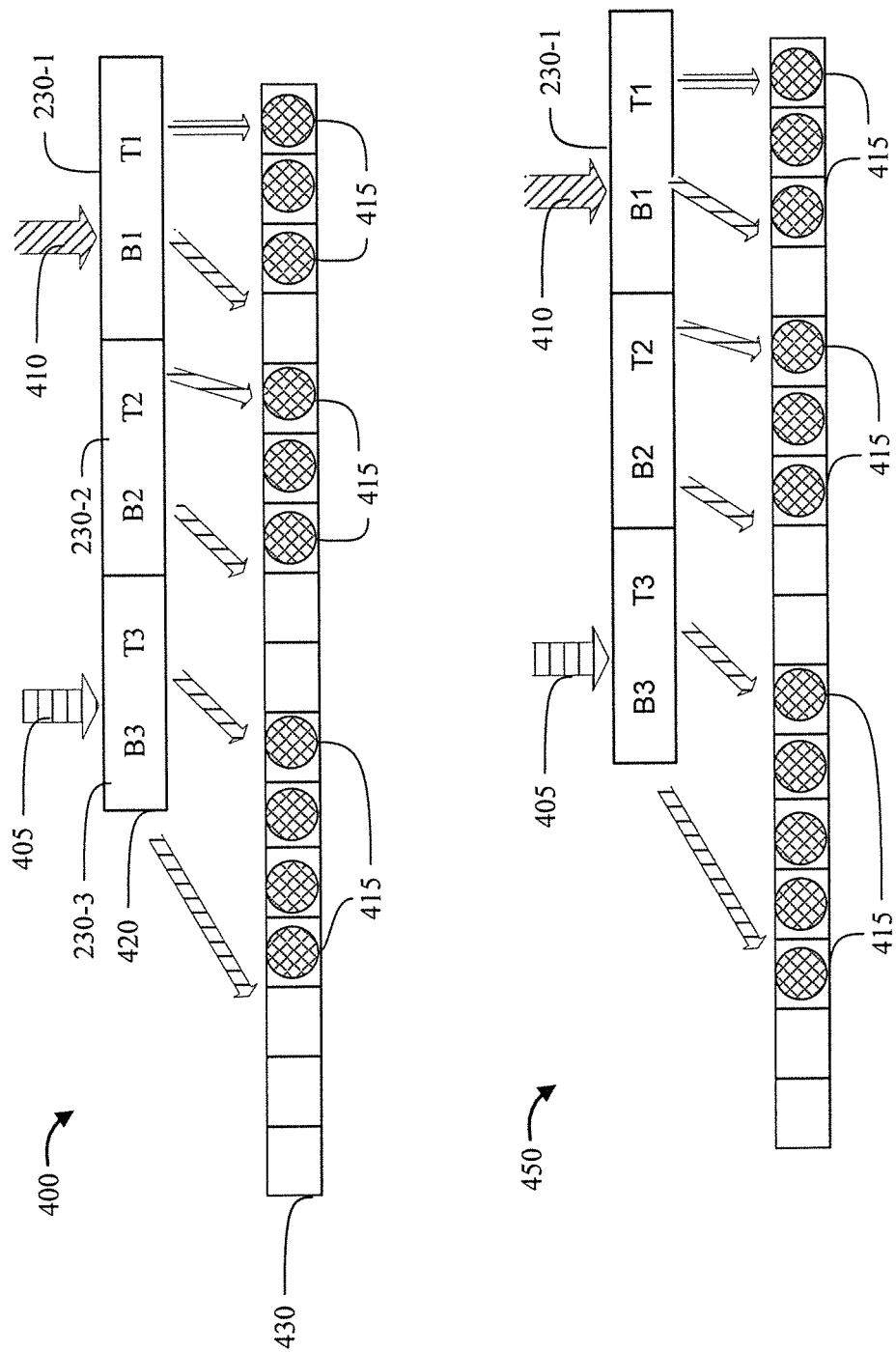
FIG. 4 is a block diagram showing a task queue and chunk queue and push of a task, in accordance with an embodiment of the present invention.

FIG. 4 is a block diagram showing a data structure to handle chunks in a task queue 400 and push of a task using the data structure 450, in accordance with an embodiment of the present invention.

As shown in FIG. 4, the data structure can be implemented to handle chunks in one task queue. A chunk 230 points to a pair of the bottom and top tasks 415 in the task queue 430 (for example, bottom B3 and top T3, B2 and T2, B1 and T1, etc.). Chunks 230 (shown as chunks 230-1, 230-2, 230-3, by way of example) are stored in the chunk queue 420. The head 410 points to the end of chunks, while the tail 405 points to the other end of chunks.

The data structure can be used to illustrate how to handle tasks with chunk queue 420, for example, starting with task queue and chunk queue at a moment as illustrated with 400.

To implement FIFO pop, an owner thread can decrease the tail and execute a full memory fence. The owner thread then loads the head.

If tail>head, the owner thread pops a task pointed by the top without the CAS operation. After popping a task, the owner thread increases the tail.

If tail==head, the owner thread gives up the FIFO pop. To cancel the attempt of the FIFO pop, it increases the tail. Instead, the owner thread attempts to pop in the LIFO manner.

If tail<head, the owner thread increases the tail because there are no tasks remaining in the task queue.

At stage 450, an owner thread pushes a task 415 to the bottom-side of the tail chunk. The bottom of the tail chunk points to the index to push a task. As shown the task 415 is added to the bottom of the task queue (corresponding to B3 from chunk 230-3).

Figure 5:
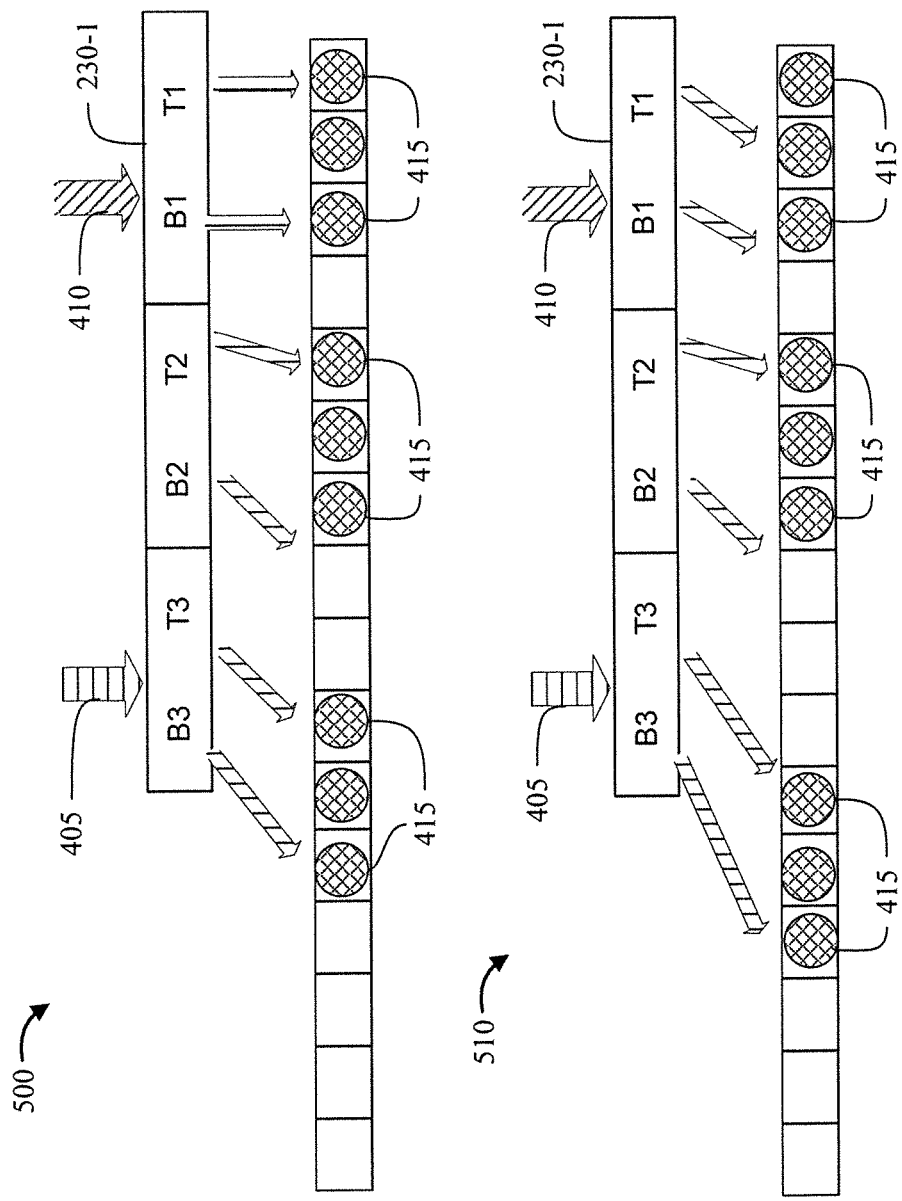
FIG. 5 is a block diagram showing a task queue and chunk queue with last in first out (LIFO) pop and FIFO pop, in accordance with an embodiment of the present invention.

FIG. 5 is a block diagram showing a task queue and chunk queue with last in first out (LIFO) pop 500 and FIFO pop 510, in accordance with an embodiment of the present invention.

As shown at stage 500 (for example, continuing from stage 400 in FIG. 4), the owner thread pops a task from the bottom-side of the tail chunk 230-3 in case of the LIFO pop (corresponding to B3). The bottom of the tail chunk points to the index to pop a task.

As shown at stage 510 (for example, continuing from stage 400 in FIG. 4), the owner thread pops a task from the top-side of the tail chunk in case of the FIFO pop (corresponding to T3). The top of the tail chunk points to the index to pop a task.

Figure 6:
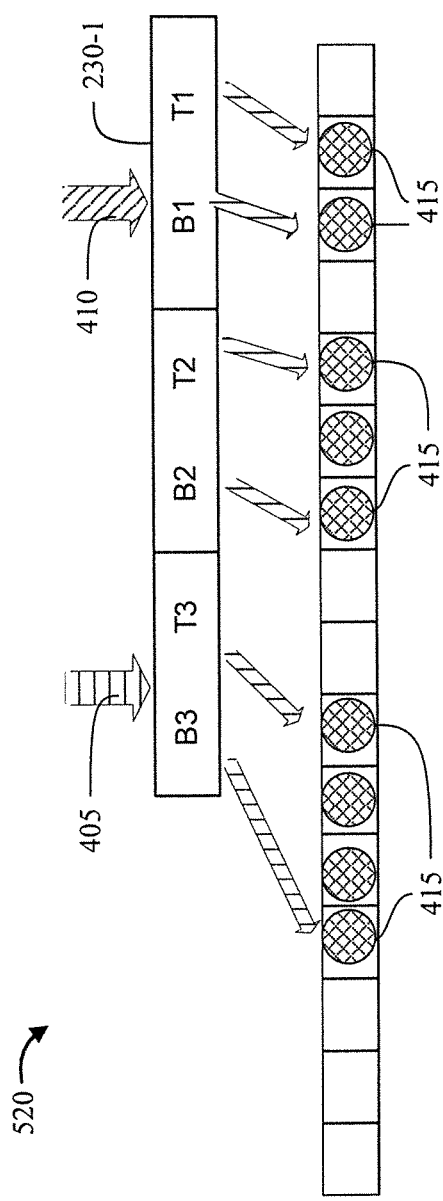
FIG. 6 is a block diagram showing a task queue and chunk queue with stealing of a task, in accordance with an embodiment of the present invention.

FIG. 6 is a block diagram showing a task queue and chunk queue with stealing of a task 520, in accordance with an embodiment of the present invention.

As shown at stage 520 (for example, continuing from stage 400 in FIG. 4), a thief thread steals a task from the top side of the head chunk (230-1).

Figure 7:
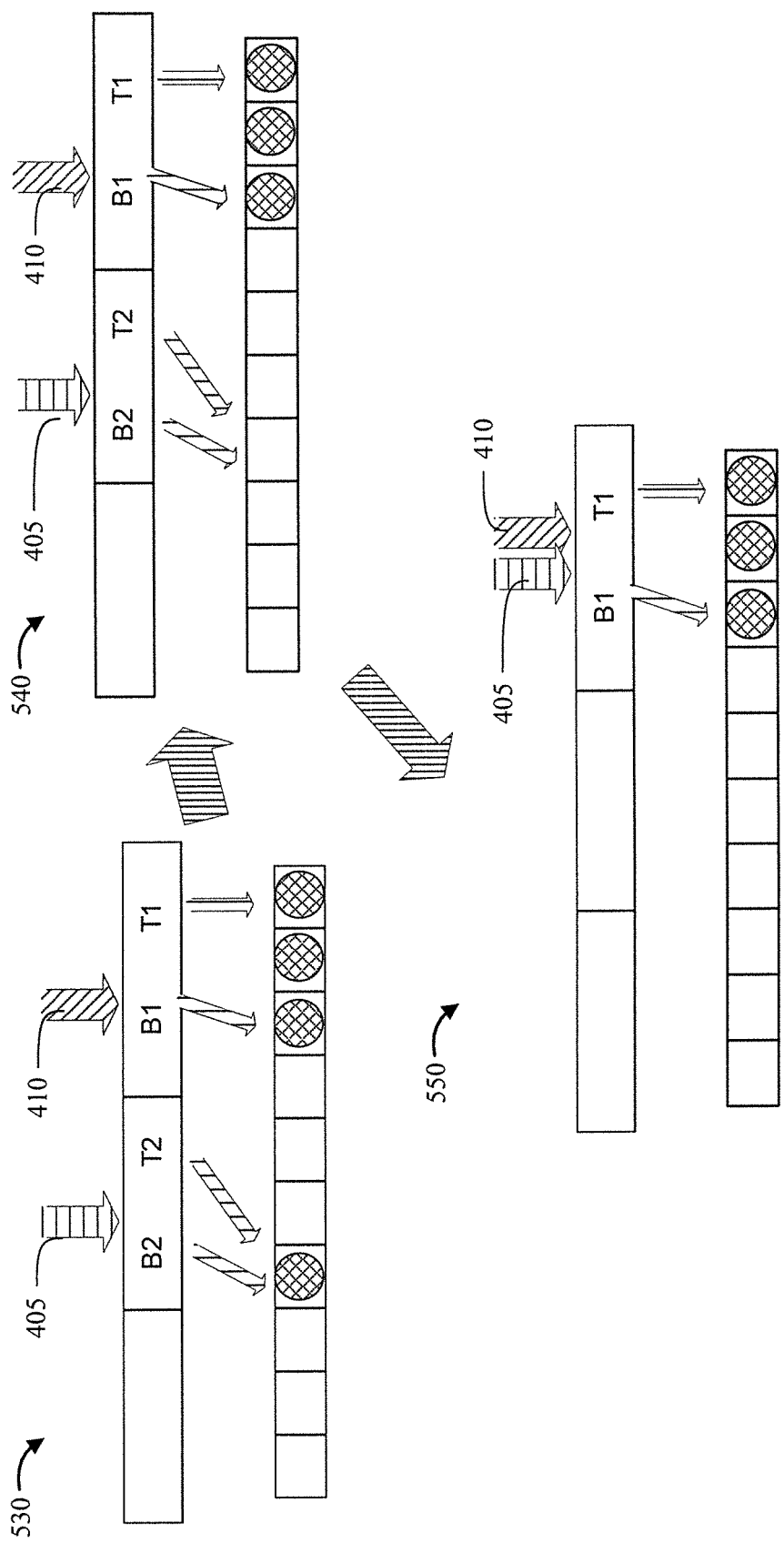
FIG. 7 is a block diagram showing a task queue and chunk queue when bottom and top of tail chunk point to a same index with work stealing by a thief thread of tasks pointed by a tail chunk, in accordance with an embodiment of the present invention.

FIG. 7 is a block diagram showing stages (530, 540 and 550) of a task and a chunk queue when bottom and top of tail chunk point to a same index, in accordance with an embodiment of the present invention.

Figure 8:
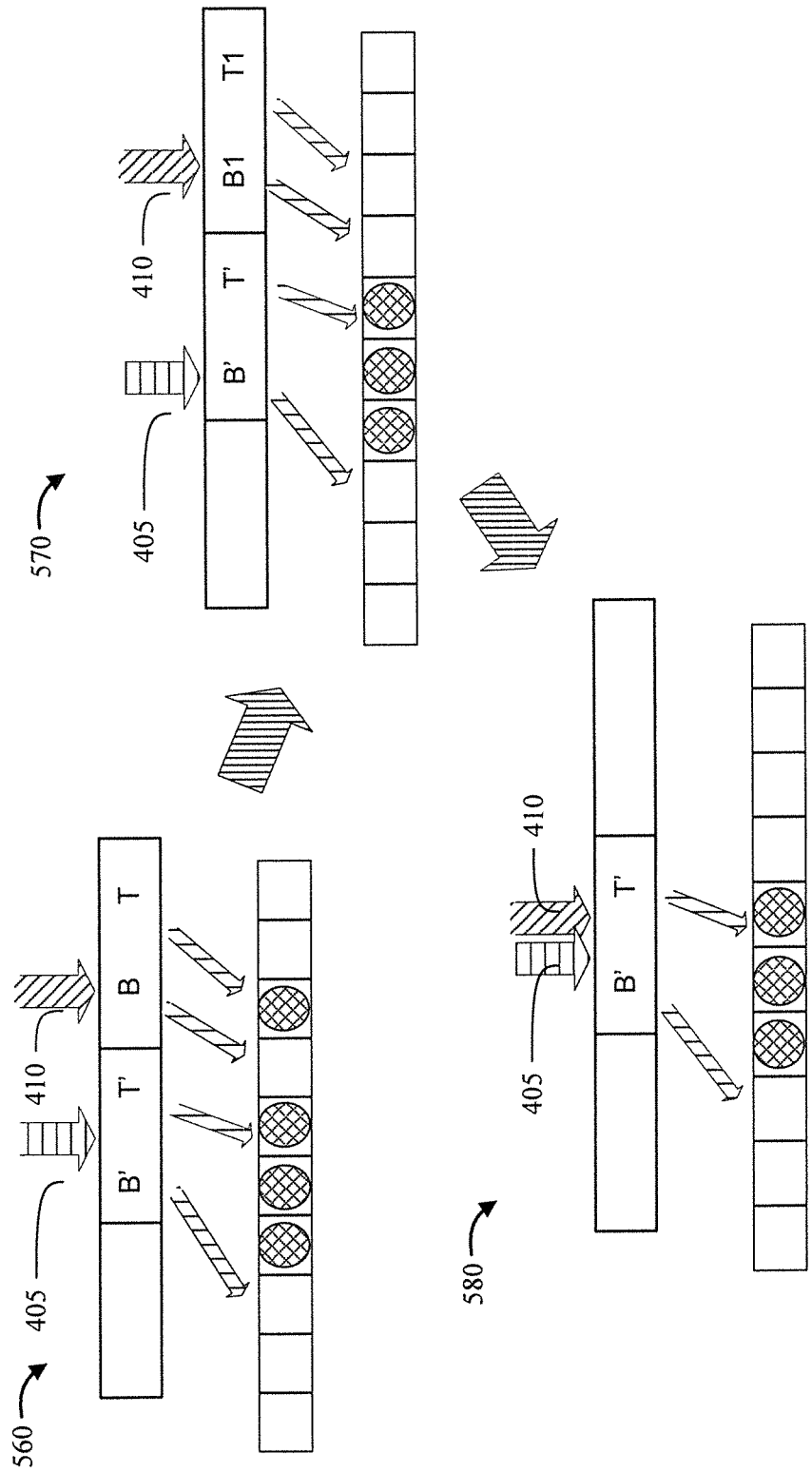
FIG. 8 is a block diagram showing a task queue and chunk queue when bottom and top of head chunk point to a same index with work stealing by a thief thread of tasks pointed by a tail chunk, in accordance with an embodiment of the present invention.

FIGS. 7 and 8 illustrate alternate examples of implementation with tail and head in the chunk queue. As shown in FIG. 7, when the bottom and top of the tail chunk point to the same index, there is no task pointed by the tail chunk. This situation happens when an owner thread processes all the tasks pointed by the tail chunk, or a thief threads steal all the tasks pointed by the tail chunk. In such cases, the owner thread decreases the tail if tail>head. If tail==head, current work-stealing finishes.

FIG. 8 is a block diagram showing stages (560, 570 and 580) of processing a task queue and chunk queue when a bottom and top of head chunk point to a same index, in accordance with an embodiment of the present invention.

As shown in FIG. 8, when the bottom and top of the head chunk point to the same index, there is no task pointed by the head chunk. This embodiment is implemented in instances in which a tail and head point the same chunk and an owner thread processes all the tasks. Alternatively, the embodiment can be applied in instances in which a thief threads processes all the tasks pointed by the head chunk. In such cases, thief thread increases the head if tail>head. If tail==head, current work-stealing finishes.

Figure 9:
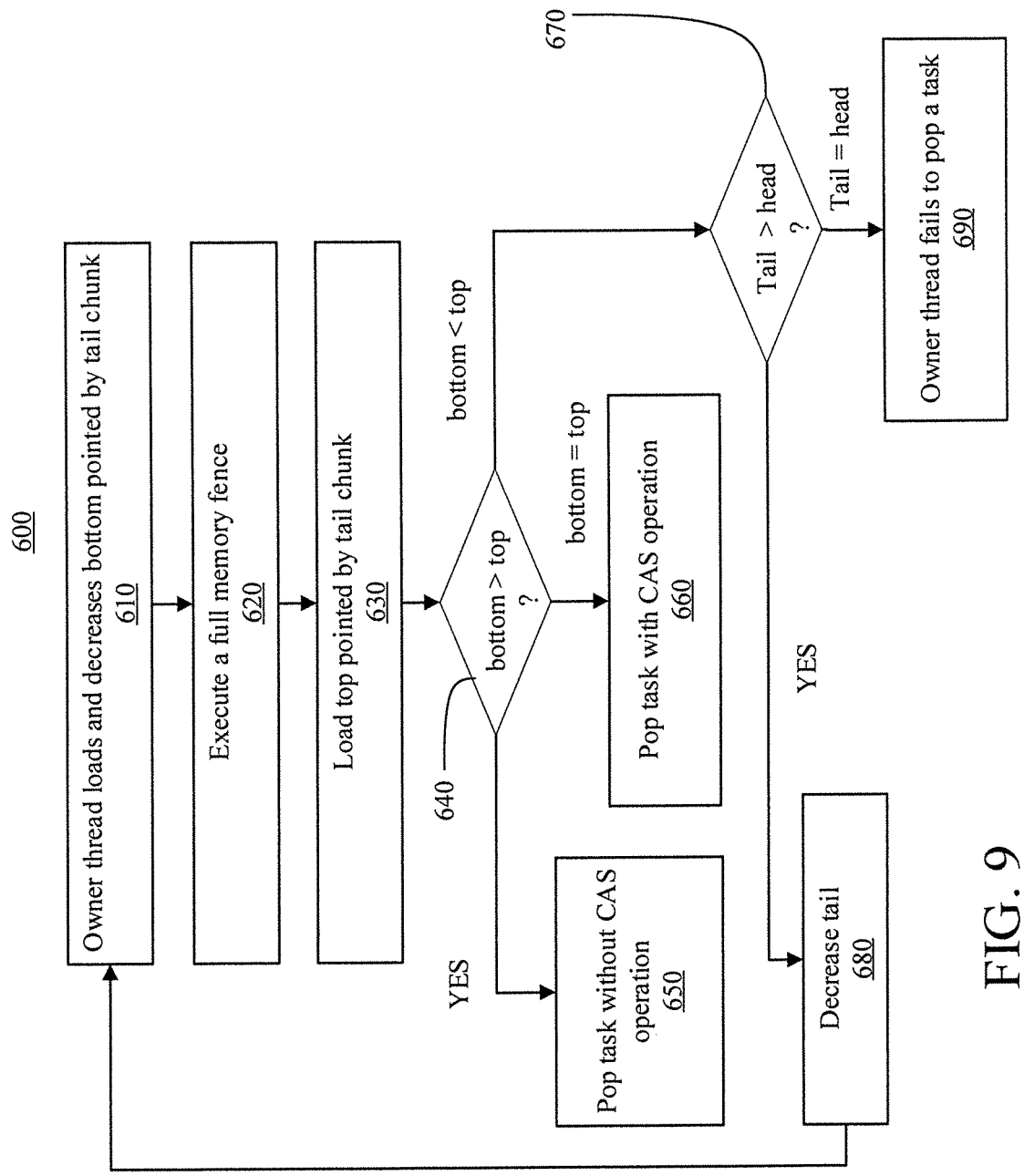
FIG. 9 is a block diagram showing an implementation of FIFO pop, in accordance with an embodiment of the present invention.

With reference to FIG. 9, a flow diagram is shown illustrating a method 600 for an owner thread popping a task, in accordance with an embodiment.

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An owner thread pops a task by the following procedure:

At block 610 (step 1), the system 200 (particularly, an owner thread) loads the bottom pointed by the tail chunk and decreases the bottom.

At block 620 (step 2), the system 200 executes a full memory fence. For example, the system 200 can execute the memory fence to cause a central processing unit (CPU) or compiler to enforce an ordering constraint on memory operations issued before and after the memory fence. Operations issued prior to the memory fence are guaranteed to be performed before operations issued after the memory fence.

At block 630 (step 3), the system 200 (particularly, the owner thread) loads the top pointed by the tail chunk.

At block 640, the system 200 determines if bottom>top.

If bottom>top (YES), at block 650, the owner thread pops a task without a compare and swap (CAS) operation. CAS is an atomic instruction used in multithreading to achieve synchronization. CAS compares the contents of a memory location with a given value and, only if they are the same, modifies the contents of that memory location to a new given value. This is done as a single atomic operation. The atomicity guarantees that the new value is calculated based on up-to-date information; if the value had been updated by another thread in the meantime, the write fails. The result of the operation indicates whether it performed the substitution (for example, either with a simple boolean response, or by returning the value read from the memory location).

If bottom==top, at block 660 (==), the owner thread pops a task with the CAS operation.

At block 670, the system 200, if bottom<top, the owner thread executes the following procedure: The owner thread determines whether tail>head.

At block 680, if tail>head, (block 860, YES) the owner thread decreases the tail and goes to the step 1 (block 610) above.

At block 690, if tail==head, the owner thread fails to pop a task.

Figure 12:
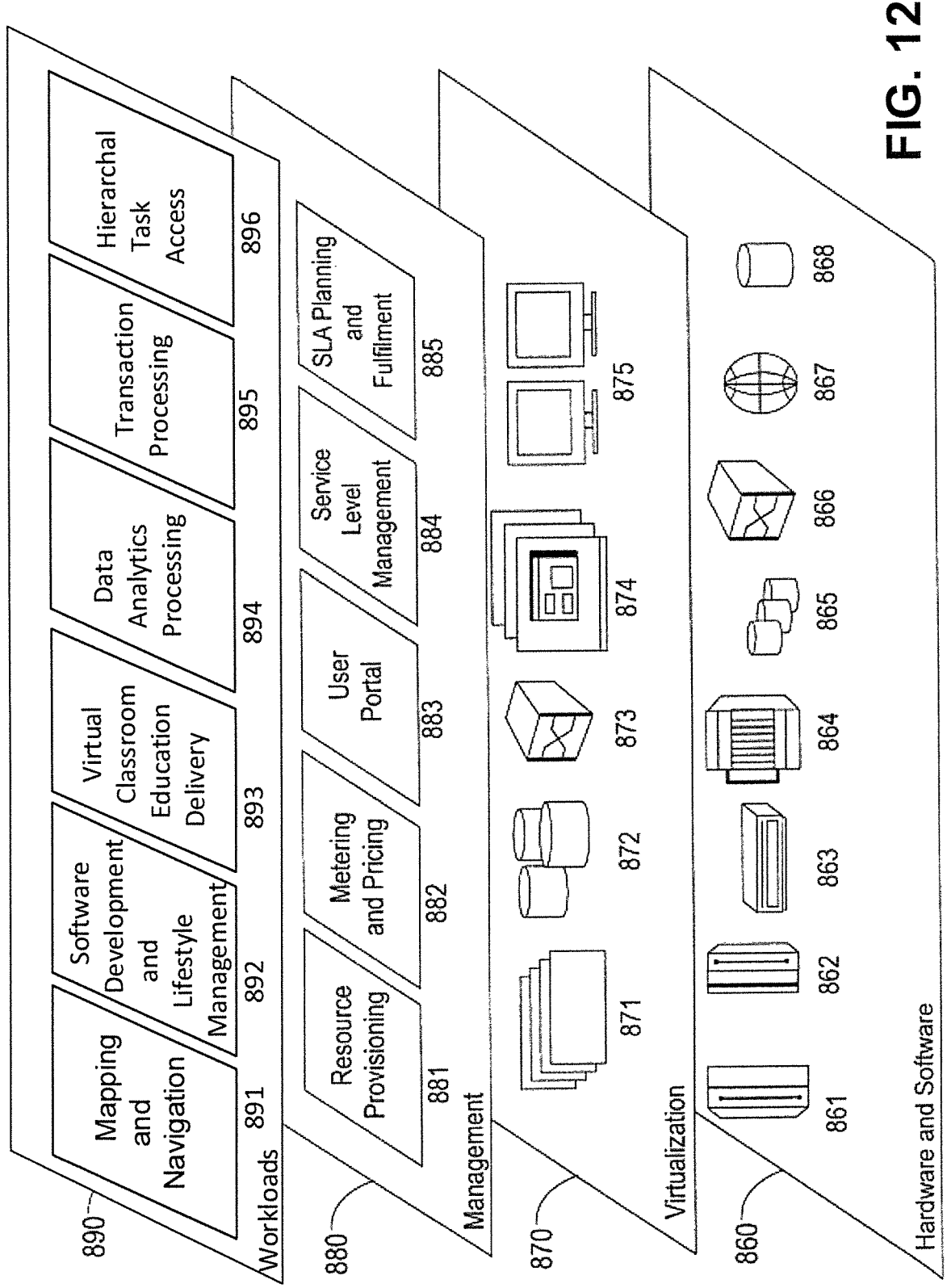
FIG. 12 is a block diagram showing a set of functional abstraction layers provided by a cloud computing environment, in accordance with an embodiment of the present invention.

With reference to FIG. 12, a flow diagram is shown illustrating a method 700 for thief thread steal a task, in accordance with an embodiment.

The system 200 (particularly, a thief thread) steals a task by the following procedure:

At block 705 (step 1), the system 200 (particularly, a thief thread) loads the top pointed by the head chunk.

At block 710 (step 2), the system 200 executes a full memory fence.

At block 715 (step 3), the system 200 loads the bottom pointed by the head chunk.

At block 720, the system 200 determines if bottom>top. If bottom>top, at block 950, the thief thread attempts a steal (at block 725).

If bottom==top, the thief thread proceeds to the next procedure: The thief thread determines whether tail>head (at block 730).

If tail>head (block 730, YES), at block 735, the system 200 increases the head with the CAS and goes to the step 1 (block 705) as described herein above.

If tail==head, at block 740, the system 200 (particularly, the thief thread) fails to steal a task.

Figure 10:
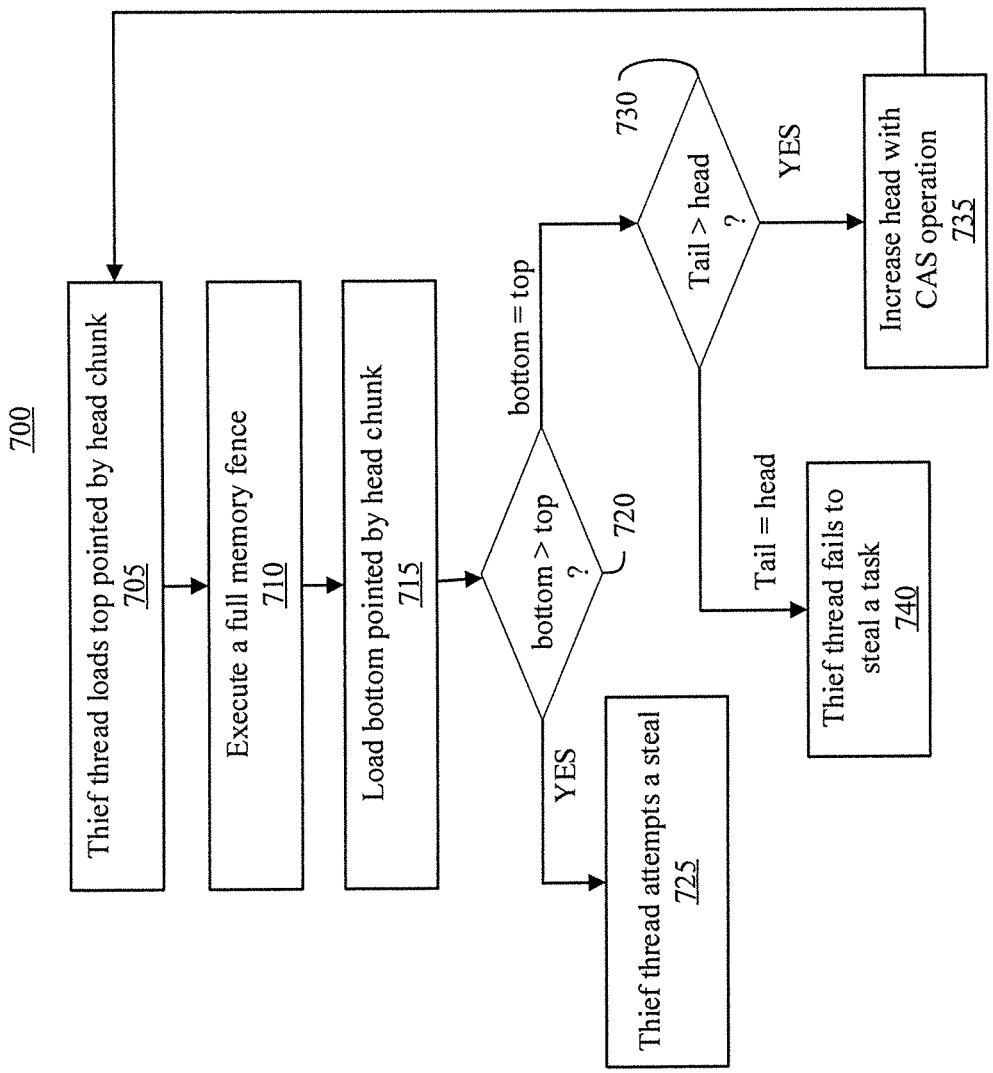
FIG. 10 is a flow diagram illustrating a method for hierarchal task access on a LIFO concurrent deque, in accordance with an embodiment of the present invention.

By implementing popping tasks by owner threads as described with respect to FIG. 9 and work stealing by thief threads as described with respect to FIG. 10, the example embodiments increase the memory locality for application threads that access objects in the breadth or hierarchical order.

The example embodiments provide decreased elapsed time as compared to approaches with LIFO pops that use a depth-first order, as measured with a PageRank benchmark. Cache miss ratio also decreases. The benchmark has access to the objects in breadth-first order. Also, the example embodiments allocate objects in breadth-first order in heap memory. Cache miss ratio decreases when the access pattern of objects by the benchmark is same as the allocated objects.

In the measurement with SPECjvm2008, the example embodiments provide observed reduced GC pause time by 17% on average due to the reduction of management overhead for the chunk queue.

Figure 11:
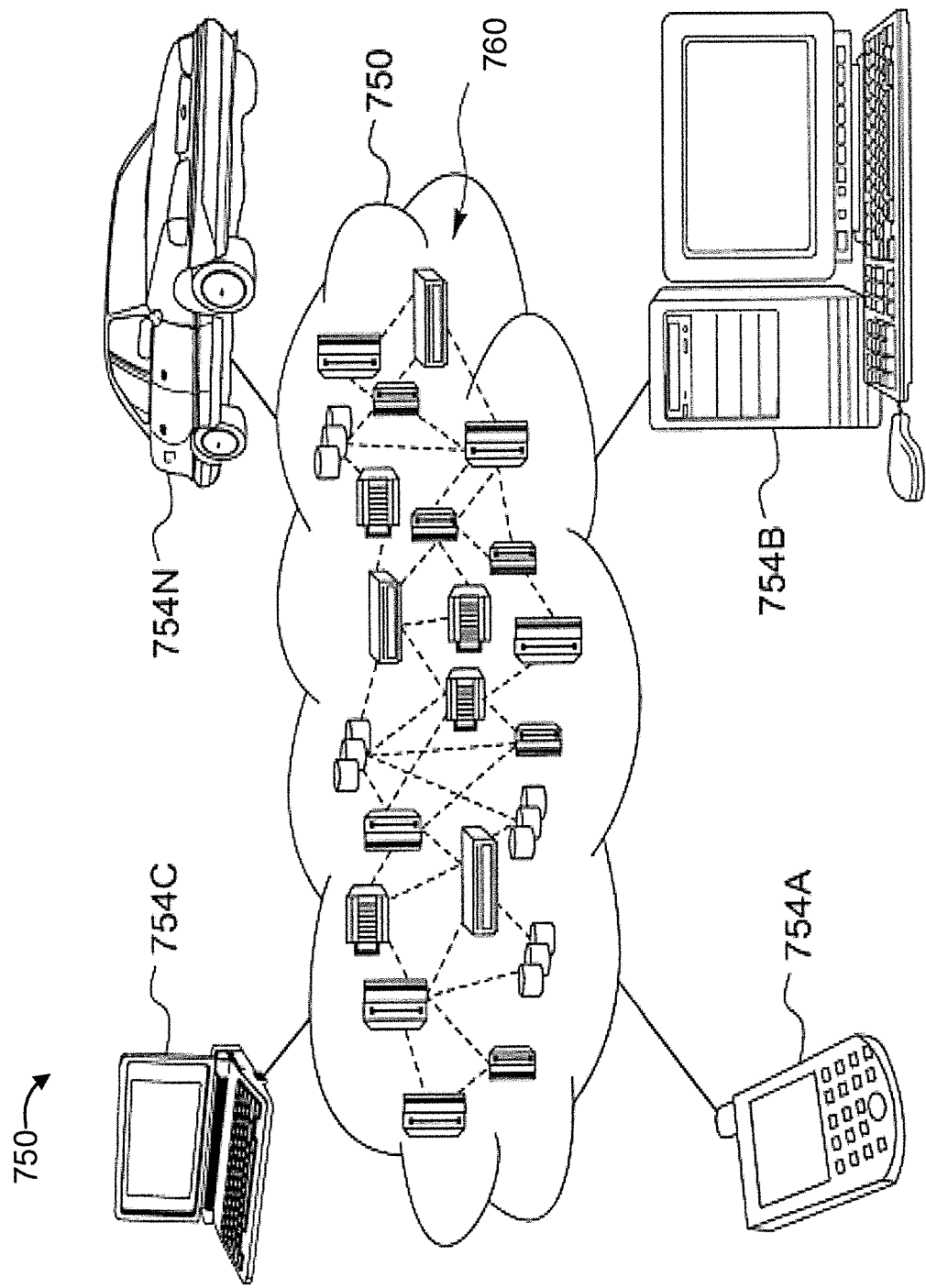
FIG. 11 is a block diagram showing an illustrative cloud computing environment having one or more cloud computing nodes with which local computing devices used by cloud consumers communicate, in accordance with an embodiment of the present invention.

Referring now to FIG. 11, illustrative cloud computing environment 950 is depicted. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As shown, cloud computing environment 750 includes one or more cloud computing nodes 760 with which local computing devices used by cloud consumers, such as, for example, personal digital assistant (PDA) or cellular telephone 754A, desktop computer 754B, laptop computer 754C, and/or automobile computer system 754N may communicate. Nodes 760 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 11 are intended to be illustrative only and that computing nodes 760 and cloud computing environment 750 can communicate with any type of computerized device over any type of network and/or network addressable connection (e.g., using a web browser).

Referring now to FIG. 12, a set of functional abstraction layers provided by cloud computing environment 750 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and hierarchal task access 896.

Hierarchal task access 896 implements processing of hierarchical tasks in a garbage collection mechanism. Hierarchal task access 896 determines chunks in a task queue. Each chunk is a group of child tasks created after processing one task. Hierarchal task access 896 also pops, using an owner thread, tasks from a top side of the task queue pointed by a chunk in a first in first out (FIFO) pop. Hierarchal task access 896 also steals, using a thief thread, tasks from a chunk in an opposite side of the task queue.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method for a garbage collection work stealing mechanism (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for processing hierarchical tasks in a garbage collection mechanism, the method comprising:
    determining at least one chunk in a task queue, wherein each chunk is a group of child tasks created after processing one task;
    popping, by an owner thread, at least one task from a top side of the task queue pointed at by at least one chunk in a first in first out (FIFO) pop;
    stealing, by a thief thread, at least one other task from a chunk in an opposite side of the task queue; and
    switching from popping by FIFO pop to popping by last in first out (LIFO) pop after the owner thread processes a predefined number of child tasks, wherein a constant number of child tasks are processed in a FIFO manner.

2. The method as cited in claim 1, wherein work-stealing by the thief thread enables both FIFO and last in first out (LIFO) ordering of objects.

3. The method as cited in claim 1, wherein work-stealing by the thief thread enables load balancing.

4. The method as cited in claim 1, further comprising:
    creating chunks by grouping a constant number of child tasks.

5. The method as cited in claim 1, further comprising:
    in response to popping the at least one task in a last in first out (LIFO) pop, processing child tasks in a FIFO manner.

6. The method as cited in claim 1, wherein an order of switching LIFO pops and FIFO pops is predefined as an a behavior of the owner thread.

7. The method as cited in claim 6, wherein a process of defining the order of switching is customizable.

8. The method as cited in claim 1, further comprising:
    owner thread creates the chunk of the child tasks before pushing the at least one task from a top side of the task queue.

9. The method as cited in claim 1, wherein each chunk points to a pair of a bottom task and a top task in the task queue.

10. A system for processing hierarchical tasks in a garbage collection mechanism, comprising:
    a memory device having program code stored thereon; and
    at least one processor device operatively coupled to the memory device and configured to execute the program code stored on the memory device to:
    determine at least one chunk in a task queue, wherein each chunk is a group of child tasks created after processing one task;
    pop, by an owner thread, at least one task from a top side of the task queue pointed at by at least one chunk in a first in first out (FIFO) pop;
    steal, by a thief thread, at least one other task from a chunk in an opposite side of the task queue; and
    switching from popping by FIFO pop to popping by last in first out (LIFO) pop after the owner thread processes a predefined number of child tasks, wherein a constant number of child tasks are processed in a FIFO manner.

11. The system of claim 10, wherein work-stealing by the thief thread enables both FIFO and last in first out (LIFO) ordering of objects.

12. The system of claim 10, wherein work-stealing by the thief thread enables load balancing.

13. The system of claim 10, wherein the at least one processor device is further configured to execute program code stored on the memory device to:
    create chunks by grouping a constant number of child tasks.

14. The system of claim 10, wherein the at least one processor device is further configured to execute program code stored on the memory device to:
    in response to popping the at least one task in a last in first out (LIFO) pop, process child tasks in a FIFO manner.

15. The system of claim 10, wherein an order of switching LIFO pops and FIFO pops is predefined as an a behavior of the owner thread.

16. A non-transitory computer readable storage medium comprising a computer readable program for processing hierarchical tasks in a garbage collection mechanism, wherein the computer readable program when executed on a computer causes the computer to perform the steps of:
    determine at least one chunk in a task queue, wherein each chunk is a group of child tasks created after processing one task;
    pop, by an owner thread, at least one task from a top side of the task queue pointed by at least one chunk in a first in first out (FIFO) pop;
    steal, by a thief thread, at least one other task from a chunk in an opposite side of the task queue; and
    switching from popping by FIFO pop to popping by last in first out (LIFO) pop after the owner thread processes a predefined number of child tasks, wherein a constant number of child tasks are processed in a FIFO manner.

* * * * *